United States Patent [19]

Humphrey

[11] 4,212,732

[45] Jul. 15, 1980

[54] RAW LIQUID WASTE TREATMENT PROCESS

[75] Inventor: James C. Fletcher, Administrator of the National Aeronautics and Space Administration, with respect to an invention of Marshall F. Humphrey, Duarte, Calif.

[73] Assignee: California Institute of Technology, Pasadena, Calif.

[21] Appl. No.: 866,271

[22] Filed: Jan. 3, 1978

Related U.S. Application Data

[63] Continuation of Ser. No. 549,417, Feb. 12, 1975, abandoned, which is a continuation-in-part of Ser. No. 390,467, Aug. 22, 1973, abandoned.

[51] Int. Cl.² ........................ C02B 1/14; C02B 3/00; C02C 5/02
[52] U.S. Cl. .................................. 210/32; 210/40; 210/67
[58] Field of Search .................. 210/10, 13, 18, 28, 210/39, 40, 45, 51–53, 66, 67, 152, 192, 195.3, 197, 198 R, 205, 32; 252/419, 421–425, 445

[56] References Cited

U.S. PATENT DOCUMENTS

| | | | |
|---|---|---|---|
| 3,741,89 | 6/1973 | Smith et al. | 210/40 |
| 1,915,240 | 6/1933 | Putnam | 210/67 |
| 2,679,477 | 5/1954 | Kivari et al. | 210/13 |
| 2,933,454 | 4/1960 | Repik et al. | 252/419 |
| 3,619,420 | 11/1971 | Kemmer et al. | 210/6 |
| 3,622,509 | 11/1971 | Shaler | 210/39 |
| 3,763,040 | 10/1973 | Timpe et al. | 210/40 |
| 3,887,461 | 6/1975 | Nickerson et al. | 210/39 |
| 3,994,804 | 11/1976 | Kalvinskas et al. | 210/40 |

OTHER PUBLICATIONS

"Sludge Pyrolysis Schemes Now Head for Tryouts," Chem. Eng., Dec. 8, 1975, pp. 90 and 92.

*Primary Examiner*—Charles N. Hart
*Assistant Examiner*—Peter A. Hruskoci
*Attorney, Agent, or Firm*—Freilich, Hornbaker, Wasserman, Rosen & Fernandez

[57] ABSTRACT

A raw sewage treatment process is disclosed in which substantially all the non-dissolved matter, which is suspended in the sewage water is first separated from the water, in which at least organic matter is dissolved. The non-dissolved material is pyrolyzed to form an activated carbon and ash material without the addition of any conditioning agents. The activated carbon and ash material is added to the water from which the non-dissolved matter was removed. The activated carbon and ash material absorbs organic matter and heavy metal ions, it is believed, are dissolved in the water and is thereafter supplied in a counter current flow direction and combined with the incoming raw sewage to facilitate the separation of the non-dissolved settleable materials from the sewage water. The used carbon and ash material together with the non-dissolved matter which was separated from the sewage water are pyrolyzed to form the activated carbon and ash material.

12 Claims, 3 Drawing Figures

RAW LIQUID WASTE TREATMENT PROCESS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

CROSS REFERENCE TO RELATED APPLICATION

This application is a continuation of application Ser. No. 549,417, filed Feb. 12, 1975 now abandoned, which is a continuation in part of application Ser. No. 390,467 filed Aug. 22, 1973 now abandoned.

BACKGROUND OF THE INVENTION

1. Field of the Invention

The present invention generally relates to a waste water treatment process and, more particularly, to a process for treating raw liquid waste which contains organic matter which is dissolved and/or suspended in the liquid.

2. Description of the Prior Art

The problems facing municipalities in treating raw sewage, which is one form of waste water, are well known. The sewage consists of water contaminated by organic and inorganic matter which is dissolved in the water as well as organic and inorganic matter which is not dissolved, namely suspended in the water. The latter-type contaminant may be divided into two groups of materials, those which are settleable in the water and those which are not settleable and tend to float on top of the water. The function of any sewage treatment system is to separate substantially all the suspended matter from the water as well as to greatly reduce the organic matter dissolved therein, and thereafter dispose of the separated matter.

The separated contaminants which are mixed with some water and therefore are in slurry form, often referred to as sludges, are biologically active until stabilized by subsequent treatment. The stabilization is generally achieved by biological digestion. Such digestion is sometimes used to produce combustible gases such as methane, useful as a source of energy. However, the remaining solid material presents difficult and costly disposal problems. Digested (humic) solids have been processed to fertilizers and soil conditioners. This practice is generally not economical and the quantity available greatly exceeds the market demands. Municipalities are finding it increasingly difficult to dispose of the remaining sludge solids in waterways, oceans or landfills, due to their ecological impact. Legislation is being considered to reduce and eventually forbid such solid dumping. Thus, disposal of solids, produced by prior art treatment systems, present a very severe problem, in addition to the high disposal cost. Other disadvantages of prior art systems in which biological digestion is employed include the large land area of aeration basins required for their operation, and the releasing of offensive odors. Also, prior art systems are relatively inefficient and must be carefully monitored and controlled to prevent any unbalancing in the biological digestion. That is, the types and/or amounts of contaminants per liter of water must be controlled to be within specified limits in order not to upset the biological digestion process.

An attempt to reduce the amount of solids requiring disposal is described in U.S. Pat. No. 3,640,820. Therein, a sewage treatment process is described in which the sewage sludges are converted into an active material which is used in the process. Several disadvantages of the system described in said patent are apparent. The proposed process is one employing biological digestion and therefore suffers from all of the shortcomings, hereinbefore discussed. In addition, it requires the use of a conditioning agent in the active material production.

In the Feb. 22, 1972 issue of Chemical Engineering, a process developed by DuPont and known as PACT for Powdered Activated Carbon Treatment is disclosed. Therein, activated carbon, which is not produced from contaminants in liquid waste is required, thereby increasing process costs. Also, the amount of material, requiring final disposal, is not reduced and therefore the disposal cost is high and the disposal problems are not solved.

OBJECTS AND SUMMARY OF THE INVENTION

It is a primary object of the present invention to provide a new sewage treatment process.

Another object of the invention is to provide a sewage treatment process in which the contaminants are used to form a material without the addition of a conditioning agent, with the material being used in the treatment process.

Yet another object of the invention is to provide a highly efficient sewage treatment process in which biological processing is not required and in which substantially all the objected-to contaminants are removed in the process by means of a material which is formed from the contaminants, with the amount of material requiring final disposal being inert and only a fraction of the total amount of contaminants.

Still another object of the invention is to provide a novel method and means of considerably reducing the time required for settling suspended matter in raw liquid sewage over that previously required.

These and other objects of the invention are achieved by a treatment process in which at least the non-dissolved matter, hereinafter also referred to as solids of screened raw sewage are separated in a primary settler from the water which contains the dissolved organic and inorganic matter. As will be pointed out hereinafter, the separation of the non-dissolved settleable solids from the water is facilitated by the addition of a slurry of an activated carbon and ash material which has been used down-stream in the process. The non-dissolved settleable solids together with the slurry of the activated carbon and ash material which settle on the bottom of the primary settler are removed as a wet slurry-and-primary-sludge mixture from the primary settler and supplied to a filter. Therein, the mixture is supplied to a pyrolysis reactor. The latter is also supplied with the non-dissolved non-settleable contaminants (solids) from the top of the primary settler.

In the reactor, the material supplied thereto is converted into a material which consists of activated carbon and ash. The activated carbon and ash material is formed into a primary slurry by the addition of water and is added to the water from which the non-dissolved matter has been separated in the primary settler. The water and the activated carbon and ash are introduced into a secondary settler, wherein a very high percentage of the organic matter, which is dissolved in the water, is adsorbed onto the carbon and ash and also, it is thought, heavy metal ions. The latter, after adsorbing the dissolved organic matter and heavy metal ions, is removed from the secondary settler, as a secondary slurry, and is directed to the primary settler into which the screened raw sewage is initially introduced. The addition of the secondary slurry, i.e., the partially used carbon and ash material to the screened raw sewage greatly reduces the separation time of the non-dissolved settleable matter from the sewage water. In addition, the presence of the carbon in the slurry-and-primary-sludge mixture which is supplied to the filter acts as a filtering aid. It promotes faster dewatering of the mixture and therefore drier material for the pyrolysis step.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
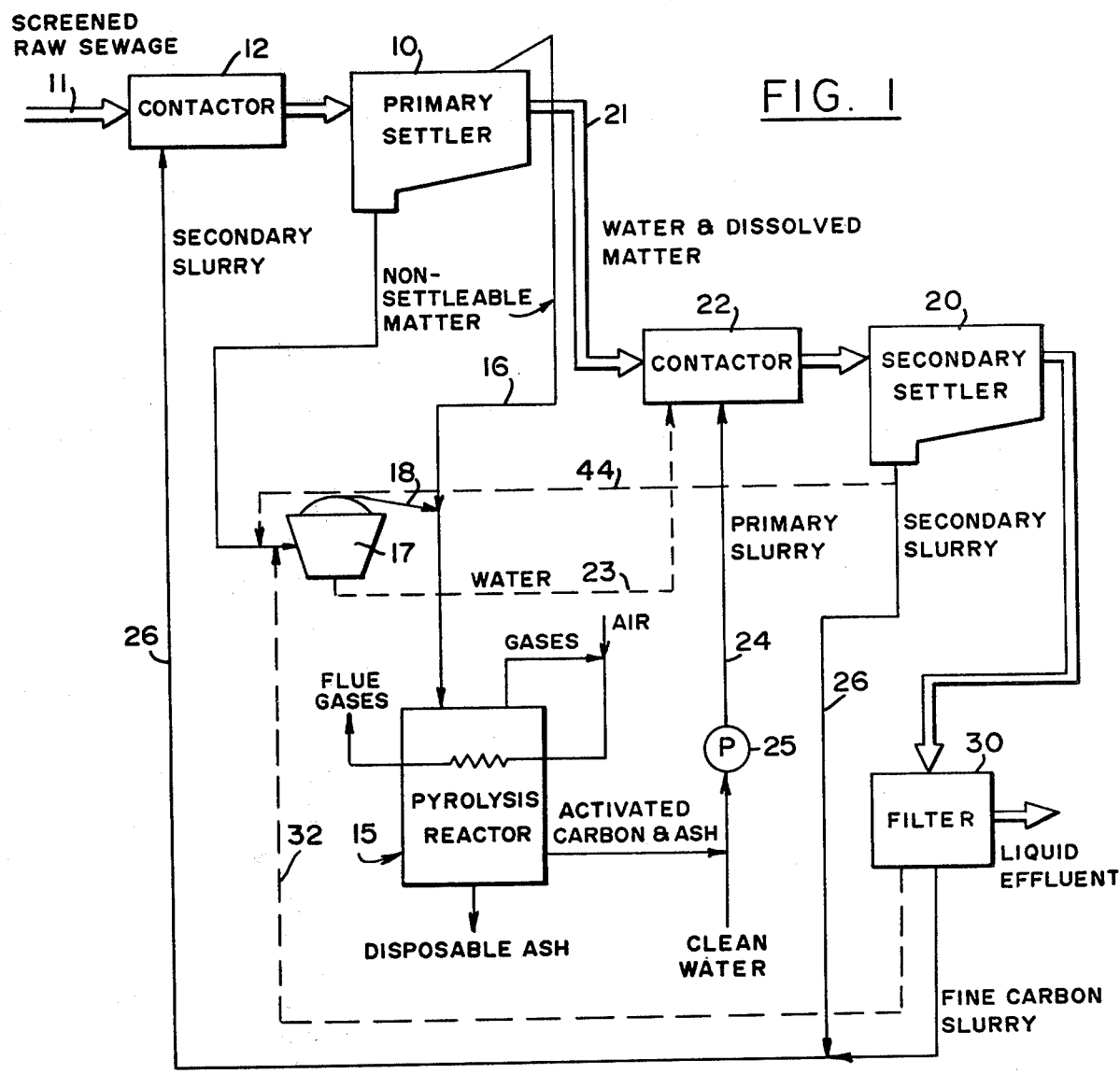
FIG. 1 is a general block diagram of the novel system and process of the present invention.

Attention is now directed to the drawing wherein numeral 10 designates a primary settler of a sewage treatment system in accordance with the present invention. As is known, raw sewage or wastewater consists of water contaminated by various organic and inorganic materials, some of which are dissolved in the water while others are non-dissolved and are suspended therein. The non-dissolved suspended materials are either of the settleable or the non-settleable types. The latter tends to float on top of the water. The function of any raw sewage treatment process is to remove the non-dissolved suspended materials, and as much as possible of the dissolved organic matter from the water.

In accordance with the present invention, raw sewage is first screened by appropriate means (not shown) in a manner well known in the art to remove all relatively large objects as well as most of the sand in the raw sewage. The screened raw sewage, hereinafter simply referred to as screened sewage, which is fed to the system on line 11 is introduced into a contactor or flocculator 12 wherein it is mixed with an incoming secondary slurry. As will be described hereinafter, the incoming secondary slurry is a slurry of activated carbon and ash material which was partially used down stream. After appropriate mixing, the screened sewage with the secondary slurry are fed to the primary settler 10.

In the present invention, substantially all of the non-dissolved suspended solid material is removed from the sewage water in settler 10. The non-settleable material which is generally skimmed off the top of the water is supplied to a pyrolysis reactor 15 directly via line 16. The settleable material, generally referred to as primary sludge, which is quite wet, i.e., has a high water content, is supplied to a dewatering stage 17, such as a filter. The function of the filter 17 is to dewater the primary sludge. The dewatered solids, generally in the form of relatively dry cakes of solids, are supplied to the reactor via line 18. Thus, the reactor 15 is supplied with all the non-dissolved suspended matter, both organic and inorganic, present in the incoming screened sewage. The sewage water from which all the suspended matter was removed in settler 10, is supplied via line 21 to a contactor 22 and therefrom to a secondary settler 20. The water from filter 17, which is relatively free of any suspended matter is preferably combined with the effluent of settler 10 in line 21 or in contactor 22, as represented by dashed line 23.

Using present day practices, the settling time of suspended but settleable contaminants in screened sewage is quite long. It has been discovered that, in accordance with this invention, the settling time for all non-dissolved settleable matter can be reduced to less than an hour by mixing the screened sewage in the contactor 12 with a sludge material derived from the secondary settler 20, comprising activated carbon and ash, and thereafter introducing the mixture into settler 10 wherein settling takes place. The settling rate of the non-dissolved settleable matter seems to depend on the ash content as well as the carbon particle size of the activated carbon and ash material. Tests with an activated carbon and ash material with 50% ash and particle size in the range of 200 mesh, produced total settling (in settler 10) of all settleable matter in 35 minutes, as compared with commercial carbon containing little or no ash which showed very poor settling characteristics. With such material, fine matter remained in suspension for as long as 24 hours.

Figure 2:
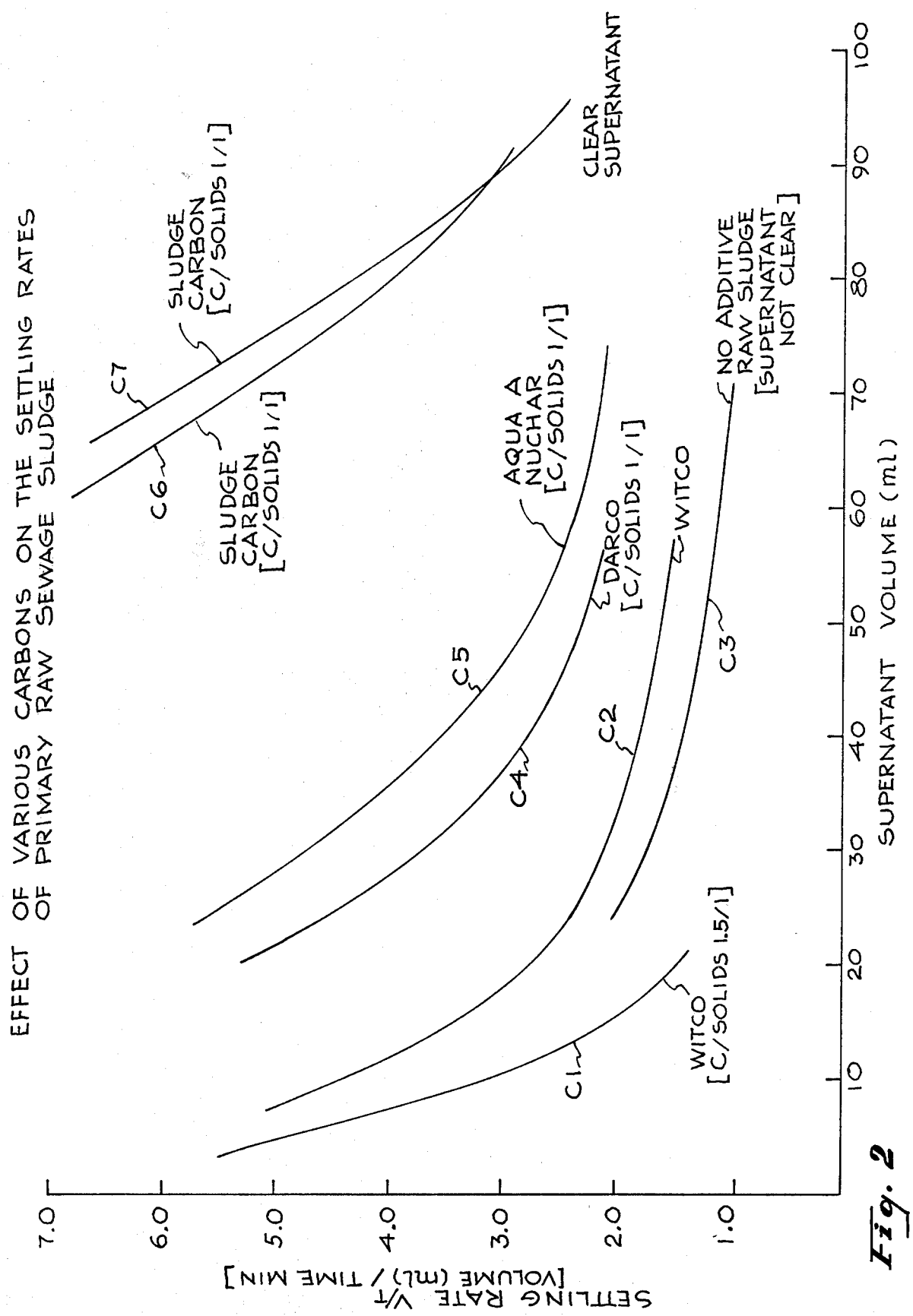
FIG. 2 shows a series of curves showing the effects on settling of sewage materials, after dosing with various types of carbon including, in accordance with this invention a sewage sludge.

FIG. 2 of the drawings shows a number of curves representing the effects on the settling rate of sewage materials, after dosing with various types of activated carbons, including activated carbons in the form of sludge, which is derived from the secondary settler 20, and may be considered as used or once used activated carbon and ash.

The data used for making the curves was obtained by mixing in 100 ml cylinders, raw sewage with the activated carbon in proportions to be given, thoroughly shaking the mixture and allowing it to settle. Time was noted for the solids level, to reach various volumes. The abscissa represents the supernatant volumes reached, the ordinate represents the settling rates, (solids volume/time (MIN).

Curve C1 represents the variation in settling rate with volume for a carbon product made by the Witco Chemical Co. of Park Ave., New York City, N.Y., and designated as Witco 80K×325 mesh size. It was mixed in the proportion of 1.5 carbon to 1 of the solids.

Curve C2 shows what happens when raw sludge is added without carbon and ash. The solid deposition rate is quite slow and the supernatant liquid is not clear.

Curve C3 shows the indicated variation for a Witco 50–140 mesh size carbon product mixed 1 to 1 carbon to solids proportion.

Curve C4 shows the indicated variations for a carbon made by I.C.I. America Inc. of Wilmington, Del. and designated as Darco G-60 also mixed in a 1 to 1 proportion with the solids in the raw sewage.

Curve C5 shows the indicated variations for a carbon product designated as Nuchar made by Westzaco of Covington, Virginia and mixed in 1 to 1 proportion with the solids in the raw sewage.

Curves C6 and C7 show the settling rate vs. volume results obtained by using sludge containing once used activated carbon and ash with the solids in the raw sewage in and 1 to 1 proportion. The sludges used were derived from two different sewage treatment plants. Curves C6 and C7 show surprisingly superior results obtainable using sludge containing the used carbon and ash over those achieved with carbons normally used for this purpose. Settlement using the sludges occurred more than twice as fast as when the unused carbon was used.

By way of explanation but not by way of a limitation on the invention, it is believed that the reason that the once used activated carbon and ash material is so much more effective in settling the suspended matter in the raw sewage than when fresh carbon and ash is used is because the majority of naturally occurring colloids and suspended matter in raw domestic sewage are electronegatively charged. The like negative charges account for the inability of the particles to coalesce or coagulate into masses that can be precipitated and separated from the liquid. The magnitude of charge difference between the particles and the surrounding or suspending liquid is called the Zeta potential. In order to effect a separation of the colloidal particles by coagulation, settling and filtration, the Zeta potential must be neutralized.

There are known ways of neutralizing particle charges such as by direct application of a positive electrical charge, biological action, or the addition of chemicals, such as organic polyelectrolytes, alumoferric chloride and lime. The use for settling suspended matter of activated carbon, produced from heterogeneous sewage sludge, which is in accordance with this invention, has not been known heretofore. Its properties appear similar to the electropositive material in its ability to coalesce and precipitate the sewage colloids.

Scanning electron microscope studies indicate that this property of the used carbon and ash may be due to the absorption of heavy metal ions that give the carbon an overall electropositive charge. Therefore when this used carbon and ash is mixed with the raw sewage it acts to neutralize the Zeta potential.

The activated carbon tends to adsorb to some extent, various substances, such as DDT, phosphates, nitrogenous substance, some metal salts, and organic complexes of mercury which are not easily separable from water by other means. It has been discovered that the addition of the carbon and ash material reduces turbidity, removes odors and reduces foaming.

As will be pointed out hereinafter, in the novel process of the present invention, an activated carbon and ash material is produced in reactor 15 from all the contaminants extracted from the sewage water. This material after being partially used to extract most of the organic matter which is dissolved in the water is mixed with screened sewage in contactor 12 and thereafter, the mixture is supplied to the primary settler 10 to facilitate the separation of the non-dissolved settleable matter from the water. In accordance with the present invention, the material which is supplied to the filter 17 is not only primary sludge (non-dissolved settleable matter) but rather a mixture of a carbon and ash slurry and primary sludge. Alternately stated, it is a slurry of a mixture of carbon and ash particles and primary sludge. The presence of the carbon is this mixture is very helpful in the filtering operation. The carbon acts as a filtering aid. It tends to promote faster filtering and higher dewatering of the mixture. Thus, drier material is supplied from the filter 17 to the reactor 15.

From the foregoing, it is thus seen that the reactor 15 is supplied with the relatively dry solids from the filter 17 and with the non-settleable sewage contaminants from the primary settler 10. In the reactor, all the supplied material is pyrolyzed under controlled temperature and pressure conditions and is converted into an activated material which consists of activated carbon and ash. This is achieved without the addition of any conditioning agents. As part of the pyrolysis operation, various gases, including combustible gases, such as methane and carbon monoxide, are released. Such gases are used to provide at least part of the energy needed for the system's operation.

The ash component represents the pyrolyzed inorganic matter, the major components of which are believed to be calcium, magnesium, iron, phosphates, sulphates oxides and other metals. The carbon component represents the pyrolyzed organic matter. A careful inspection of the material reveals that it does not consist of a mixture of separate carbon particles and ash particles but rather of particles which are a combination of carbon and ash. It has been noted that the activated carbon and ash material produced from typical domestic screened raw sewage has about a 50% ash content which is very useful in the separation of the settleable solids from the water in the primary settler 10.

It should be stressed that the material produced in the reactor 15 is activated rather than inactivated carbon and ash. Activated carbon and various techniques of producing it are described in a book entitled "Activated Carbon" by John W. Hassler, published in 1963 by Chemical Publishing Company, Inc., of New York.

The fresh activated carbon and ash from the reactor 15 is combined with clean water to form a primary carbon-ash slurry which is supplied to the contactor 22 via line 24. The latter may incorporate a pump 25 to pump the primary slurry to the contactor 22. The pump which may be a centrifugal pump may also be used to control the average size of the particles of the carbon and ash material. The fresh activated carbon and ash is mixed in contactor 22 with the water, from which all non-dissolved matter was removed and which now contains only the dissolved matter, both organic and inorganic. This mixture is then supplied to the secondary settler 20. Therein the activated carbon and ash adsorbs a very high percentage of the dissolved organic matter and settles on the bottom of settler 20.

The adsorption efficiency was found to be quite high due to the fact that the absorbing carbon is the fresh carbon from the reactor 15. Also, since the water in settler 20 is free from any non-dissolved contaminants such as greases, which were removed in the primary settler 10, none of the carbon-ash particles becomes coated with any matter which may inhibit the adsorbability of organic matter thereon. The activated carbon and ash material is capable of adsorbing the organic matter dissolved in the water even at relatively low organic matter concentration as well as heavy metal ions. It has been discovered that very good results are achieved when the primary slurry contains an amount (by weight) of carbon about equal to the amount of total organic matter in the original screened sewage which enters the primary settler 10. After an appropriate contact time, e.g., 20 minutes, the activated carbon and ash, which adsorbed the organic matter is removed as a secondary carbon-ash slurry from settler 20 and is supplied via line 26 to the contactor 12, to which the screened sewage is supplied.

The reasons for adding the secondary carbon-ash slurry to the raw sewage have been previously discussed. Even though the carbon and ash material in the secondary slurry was already partially used in the secondary settler 20, its usefulness is not at an end. It facilitates the separation of the non-dissolved suspended matter of the sewage in addition to adsorbing or otherwise removing some materials which are difficult to otherwise separate from the water. The partially used activated carbon and ash in the primary settler 10 is also believed to adsorb some of the inorganic and organic matter dissolved in the water. However, its primary function is to facilitate the separation of non-dissolved matter from the sewage water.

From the foregoing, it is thus seen that in accordance with the present invention, an activated carbon and ash material is formed from the contaminants of the screened sewage without the addition of any conditioning agents. This activated carbon and ash material is first used to adsorb most of the organic matter dissolved in the sewage water from which non-dissolved matter was previously removed. Then, the partially used carbon and ash material is mixed with the incoming raw sewage. The presence of the material facilitates the separation of non-dissolved settleable matter from the sewage water by greatly reducing the settling time. The mixture of the wet non-dissolved settleable matter, representing primary sludge, together with the used carbon and ash material are then supplied as a slurry-and-sludge mixture to the filter, whose function is to reduce the mixture water content. The carbon present in the mixture acts as a filtering aid which increases filtering rates and reduces the water content of the solid materials which are supplied to the reactor 15 for pyrolysis.

From the foregoing, several significant advantages of the present invention should become apparent. First, the present invention eliminates the biological digestion stage which is typical of most prior art systems. Its elimination reduces system size, complexity and cost. Secondly, all the material which is needed for the treatment process, i.e., the activated carbon and ash material is produced from the sewage contaminants without the need for any additional conditioning agents. Tests of the present invention with typical screened sewage indicate that in the pyrolysis step, sufficient combustible matter and gases are formed which can provide nearly all the power necessary to sustain the system's operation. Thus, energy from external sources may not be required. Also, these tests indicate that the amount of material which has to be disposed of is only about 1/10 the total contaminant materials in the sewage, thereby greatly reducing the material disposal problem.

The basic system in accordance with the present invention is effectively a 2-stage system since it includes only the primary and secondary settlers in the water flow path. Laboratory tests indicate that with the present system and process between 87 and 93% of all organic matter can be removed from the water after passing through the secondary settler. In the prior art, 2-stage systems, with one of the stages being a biological digestion stage, only about 80–85% of the organic matter is removed. Thus, the present system is clearly more efficient.

It is believed that the organic matter remaining in the water, in settler 20 after it was treated by the fresh activated carbon and ash material consists of matter of high molecular weight which is generally not adsorbable by carbon. By hydrolyzing the raw sewage in the primary settler or ahead of it, the molecular weight of such matter may be lowered so that even a higher percentage of the organic matter will become adsorbed by the carbon. Thus, hydrolysis may increase the system's efficiency.

In practice, most of the activated carbon and ash material which is introduced into the secondary settler 20 settles therein and is removed therefrom as the secondary carbon-ash slurry. However, the carbon and ash material includes some very small particles which tend to remain suspended in the water in the secondary settler. They can be removed by passing the water effluent from the secondary settler 20 through an appropriate filter, designated by numeral 30. The carbon particles trapped by filter 30 may then be removed from the filter in the form of a fine carbon slurry and thereafter be combined with the secondary carbon-ash slurry for subsequent use in the primary settler 10. Alternately, the fine carbon slurry from filter 30 may be supplied directly to the filter 17 as indicated by dashed line 32, for use therein together with the other matter which is supplied thereto from the primary settler 10.

It should be appreciated that for the system to be self-sustaining, at least as far as the production of the activated carbon and ash material, the treated sewage should contain a sufficient amount of organic contaminants. Processed typical domestic raw sewage contains a sufficient amount of contaminants. The average composition of domestic raw sewage has been described in the literature and is well known by those familiar with the art. The present invention is capable of processing sewage with higher than conventional contaminant content. The higher contaminant content merely results in the production of more activated carbon and ash material which is no way detrimental to the system's operation. The additional carbon and ash material may be used as a source of energy. This is not the case in prior art systems in which biological digestion is employed. Therein, the types of contaminants, such as toxic chemicals and/or their amounts cannot exceed certain limits. Otherwise, the biological digestion process is greatly upset which often causes the entire treatment process to be shut down. It is this high sensitivity of prior art systems, which employ biological digestion to over-contaminated sewage, or to liquid wastes which contain certain contaminants, e.g., chromium, acids, and alkalies, which often forces municipalities to inhibit various industries from injecting their wastewater into the wastewater networks of the municipalities.

Although the invention has been described in connection with treating screened raw sewage, it should be apparent that it is applicable to treat any type of waste water, which is contaminated by organic and inorganic materials. Screened raw sewage is only one type of waste water. Furthermore, the invention can be used to treat any liquid contaminated by organic and inorganic materials in any industrial or agricultural process. As used herein, the term raw liquid waste intends to refer to any contaminated liquid, including water but not limited thereto. For example, the present invention may be used to treat raw liquid waste produced in an industrial or agricultural process in order to enable the liquid to be reused. Also, it may be used to reduce the contaminant content of the liquid waste to permit the liquid to be injected in the general wastewater network of a neighboring municipality or into the natural surroundings.

Figure 3:
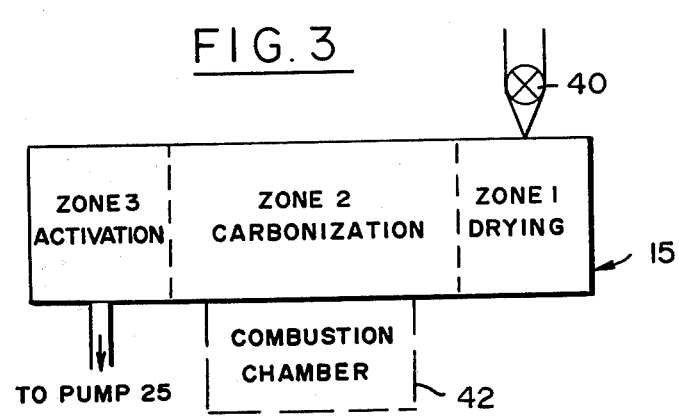
FIG. 3 is a simplified cross sectional view of one possible embodiment of a pyrolysis reactor, shown in FIG. 1.

In one embodiment, which was actually reduced to practice, very satisfactory activated carbon and ash material was produced in reactor 15 which operated at a temperature between 1200 and 1800 degrees Fahrenheit (660 to 982 degrees Centigrade) under an atmosphere composed of a mixture of gases. The mixture of gases, at a pressure slightly higher than atmospheric pressure, was composed of the gases derived from the pyrolysis operation consisting mainly of carbon dioxide, carbon monoxide, hydrogen and water vapor in the form of superheated steam. The pyrolysis reactor 15 consisted of three principal reaction zones comprised of: Zone 1, water evaporation or drying, Zone 2, carbonization or decomposition, Zone 3, activation or selective oxidation, as shown in simplified form in FIG. 3. The matter supplied to the reactor unit lines 16 and 18 was introduced into Zone 1 through a valve 40. The matter was advanced from zone to zone by rakes supported on a rotatable shaft (not shown). Heat was provided by a combustion chamber 42. The mixture of gases which was formed served to dry the matter in Zone 1 as well as activate the carbon in Zone 3. As is appreciated, some of the gases, such as methane and carbon monoxide which are combustible, can be used as a source of energy. Although, the superheated steam was used to produce a satisfactory activated carbon and ash, if desired, steam produced from clean water may be used for the carbon activation.

Retention time in Zone 3, activation, determined the degree of activation and varied from 15 minutes to one hour. Retention time is a function of the reactor furnace design and can vary from as little as five seconds to as much as five hours. Longer times for activation tend to produce greater activation of the carbon but reduce the proportion of carbon and increase the proportion of ash. Lower retention times for activation tend to decrease the degree of activation and increase the proportion of carbon and decrease the proportion of ash. The activation retention times of 15 minutes to one hour was found to produce the proper degree of activation of the product and the proper combination of carbon and ash for satisfactory operation of the process.

It should be appreciated that modifications may be made in the system and process hereinbefore described without departing from the spirit of the invention. For example, if the raw liquid waste is of a type in which the non-dissolved settleable matter settles speedily without the addition of any carbon and ash material, the secondary carbon-ash slurry from settler 20 may be supplied directly to the filter as represented by dashed line 44 rather than to contactor 12 and therefrom to the primary settler 10. Also, if the raw liquid waste is highly contaminated so that a large amount of activated carbon and ash material is produced, some of the material may be supplied directly to contactor 10 rather than through secondary settler 20, while the rest of the material may be used for adsorbing the dissolved organic matter in the liquid in settler 20. Also, although various parts of the system were described as contactors, settlers, etc., any devices performing equivalent functions may be substituted therefor. All such modifications and equivalents are deemed to fall within the scope of the invention as claimed in the appended claims.

What is claimed is:

1. A process for treating screened raw aqueous waste, characterized by the absence of a biological digestion stage, including the steps of:
   receiving screened raw aqueous waste which comprises an aqueous liquid in which matter is dissolved and nondissolved matter including floatable matter;
   mixing the received screened raw aqueous waste with a used activated carbon and ash material to form a first mixture;
   permitting said first mixture to stand for a predetermined period for enabling the settling of nondissolved matter in said aqueous liquid, together with the used activated carbon and ash material to form a primary sludge with said floatable matter floating on top of said liquid;
   separating the liquid in which matter remains dissolved, representing a first effluent, from said primary sludge and said floatable matter;
   pyrolyzing said primary sludge to form fresh activated carbon and ash material;
   mixing at least some of the fresh activated carbon and ash material with said first effluent to form a second mixture;
   permitting said second mixture to stand for a predetermined interval to enable the fresh activated carbon and ash material therein to adsorb matter in said first effluent, and to thereafter settle as a used carbon and ash material;
   separating said settled used carbon and ash material from the rest of said second mixture; and
   transferring the separated used carbon and ash material for direct mixing with said received screened raw aqueous waste.

2. A process as described in claim 1 including the step of mixing the fresh activated carbon and ash with a liquid to form a primary slurry for mixing with said first effluent to form said second mixture.

3. A process as described in claim 1 wherein after said used activated carbon and ash material is separated from said second mixture there are included the further steps of
   filtering the remainder of said second mixture, representing a second effluent to remove carbon particles therefrom and
   adding said removed carbon particles to said used activated carbon and ash for mixing with said removed screened raw aqueous waste.

4. A process as described in claim 1 wherein the floatable matter from which said first effluent was separated is activated together with said primary sludge to form said fresh activated carbon and ash material.

5. A process as recited in claim 1 wherein the amount of used carbon and ash material which is added to the screened raw aqueous waste is sufficient to provide an amount of carbon by weight on the order of the weight of organic matter in the screened raw aqueous waste.

6. A process as described in claim 1 wherein said raw aqueous waste is raw sewage.

7. The process as described in claim 1 wherein said raw aqueous waste is an industrial liquid waste.

8. In a method for treating aqueous waste which includes an aqueous liquid in which organic and inorganic matter is dissolved, further including non-dissolved settleable matter and floatable matter wherein the liquid waste is first introduced into a primary settling tank for settling the nondissolved settleable matter, which is then separated as a primary sludge and supplied to a pyrolyzer to form fresh activated carbon and ash material, at least some of the fresh activated carbon and ash material being thereafter mixed with the liquid derived from the primary settling tank and fed to a secondary settling tank, where the fresh activated carbon and ash material adsorbs matter in the aqueous liquid with which it was mixed and settles to the bottom of the secondary settling tank as a slurry, the method being characterized by the absence of a biologically-digestive step, an improvement for shortening settling time in said primary settling tank, and for increasing the adsorption of matter by said fresh activated carbon and ash material, the steps comprising:

removing said slurry from said secondary settling tank;

mixing said slurry with said incoming aqueous waste, prior to its introduction into said primary settling tank to form a mixture;

transferring said mixture to said primary settling tank;

permitting said mixture to stand in said primary settling tank for a predetermined interval whereby the nondissolved settleable matter and the slurry settle out of said mixture as said primary sludge within a shorter interval than has been previously achieved and said floatable matter floats on said liquid in said primary settling tank; and removing said floatable matter from said primary settling tank to thereby separate it from the aqueous liquid which is subsequently mixed with the fresh activated carbon and ash material for subsequent feeding to said secondary settling tank.

9. In a method as recited in claim 8 wherein in the improvement the amount of the slurry mixed with incoming aqueous waste is sufficient to provide an amount of carbon by weight at least equal to the weight of organic matter in the aqueous waste.

10. In a method as recited in claim 8, wherein said aqueous waste is screened raw sewage.

11. In a method as recited in claim 8 wherein said aqueous waste is industrial waste.

12. In a method as recited in claim 8 the improvement further including the steps of:

filtering the liquid left in said secondary settling tank after removal of said slurry to remove carbon particles suspended therein; and adding the carbon particles, so removed, to said slurry.

* * * * *